(12) United States Patent
Strand

(10) Patent No.: US 8,549,597 B1
(45) Date of Patent: Oct. 1, 2013

(54) TEMPORARY VIRTUAL IDENTITIES IN A SOCIAL NETWORKING SYSTEM

(75) Inventor: William Alexander Strand, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 616 days.

(21) Appl. No.: 12/780,510

(22) Filed: May 14, 2010

(51) Int. Cl.
  *H04L 29/06* (2006.01)
(52) U.S. Cl.
  USPC ............................ 726/7; 705/319; 705/1.1
(58) Field of Classification Search
  USPC ........................................................... 726/7
  See application file for complete search history.

(56) References Cited

U.S. PATENT DOCUMENTS

| | | | | |
|---|---|---|---|---|
| 7,366,892 B2* | 4/2008 | Spaur et al. | .................... | 713/151 |
| 7,620,404 B2* | 11/2009 | Chesnais et al. | ........... | 455/456.1 |
| 7,873,710 B2* | 1/2011 | Kiley et al. | .................... | 709/220 |
| 8,086,855 B2* | 12/2011 | Katz et al. | ..................... | 713/170 |
| 8,150,967 B2* | 4/2012 | King et al. | .................... | 709/224 |
| 8,275,394 B2* | 9/2012 | Mattila et al. | .............. | 455/456.3 |
| 8,407,773 B1* | 3/2013 | Hayter et al. | ...................... | 726/7 |
| 2003/0158960 A1* | 8/2003 | Engberg | ......................... | 709/237 |
| 2011/0191838 A1* | 8/2011 | Yanagihara | ........................ | 726/7 |
| 2012/0192258 A1* | 7/2012 | Spencer et al. | .................... | 726/7 |

OTHER PUBLICATIONS

Beach, Aaron; Gartrell, Mike; Han, Richard. Solutions to Security and Privacy Issues in Mobile Social Networking. CSE '09 International Conference on Computational Science and Engineering. Pub. Date: 2009. vol. 4, relevant pp. 1036-1042. Found on the World Wide Web at: http://ieeexplore.ieee.org/stamp/stamp.jsp?tp=& arnumber=5283078.*

Twitter, retrieved on Jul. 30, 2010. http://twitter.com/about. pp. 1-4.

* cited by examiner

*Primary Examiner* — Nathan Flynn
*Assistant Examiner* — Jeremiah Avery
(74) *Attorney, Agent, or Firm* — Thomas | Horstemeyer, LLP

(57) ABSTRACT

Disclosed are various embodiments for facilitating temporary virtual identities in a social networking system. An identity associated with a user is authenticated. A time period, location or other parameter associated with the user is authenticated. The temporary virtual identity is registered in the social networking system. Content generated by the user is published in the social networking system under the temporary virtual identity.

26 Claims, 5 Drawing Sheets

TEMPORARY VIRTUAL IDENTITIES IN A SOCIAL NETWORKING SYSTEM

BACKGROUND

In a social networking system, such as a user community, a blogging system, a microblogging network, or other systems, users often have a permanent identity with which they interact with other users. For example, a user may publish content in a social networking system, and other users with which he is associated may see the published content. In a social networking system such as a blogging network, the content may be publicly accessible and can be associated with the permanent identity of the user. As another example, in a microblogging network, a user may publish content that is publicly accessible and/or accessible by other users who are linked with the permanent identity of the user.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same. This disclosure describes systems and methods for establishing, registering, and authenticating a temporary virtual identity in a social networking system. As discussed herein, a social networking system can also include any type of virtual user community, blogging service, microblogging service, etc., in which a user has an identity. The temporary virtual identity can be associated with an identity of a user in the social networking system. The embodiments described herein also relate to publishing content under such a temporary virtual identity. The content can be published in a form that links or associates the content with a temporary virtual identity and the identity of the user in the social networking system, or the content can be published in a form that only links the content with the temporary virtual identity. For the sake of convenience, first a networked environment is described, followed by a discussion of the operation of the various components of the data communications network according to various embodiments.

Figure 1:
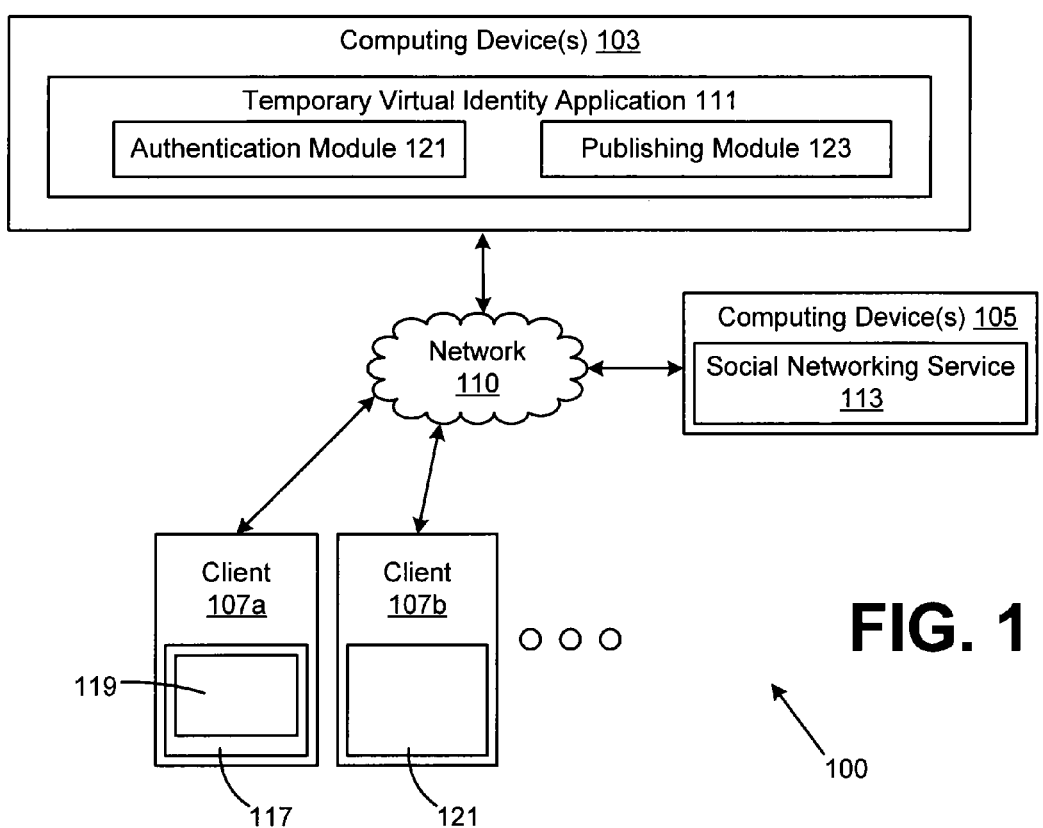
FIG. 1 is a drawing of networked environment according to various embodiments of the present disclosure.

With reference to FIG. 1, shown is an example of a networked environment 100 according to various embodiments. The networked environment 100 includes one or more computing devices 103, 105, clients 107, and/or mobile devices 109. The network 110 includes, for example, the Internet, intranets, extranets, wide area networks (WANs), local area networks (LANs), wired networks, wireless networks, or other suitable networks, etc., or any combination of two or more such networks.

The computing device 103, 105 may comprise, for example, a server computer or any other system providing computing capability. Alternatively, a plurality of computing devices 103, 105 may be employed that are arranged, for example, in one or more server banks or computer banks or other arrangements. For example, a plurality of computing devices 103, 105 together may comprise, for example, a cloud computing resource, a grid computing resource, and/or any other distributed computing arrangement. Such computing devices 103, 105 may be located in a single installation or may be dispersed among many different geographical locations. In one embodiment, the computing device 103, 105 represents a virtualized computer system executing on one or more physical computing systems. For purposes of convenience, the computing devices 103, 105 are referred to herein in the singular. Even though the term "computing device" is referred to in the singular, it is understood that a plurality of computing devices 103, 105 may be employed in the various arrangements as described above.

The components executed on the computing device 103, for example, include a temporary virtual identity application 111 as well as other applications, services, processes, systems, engines, or functionality not discussed in detail herein. The temporary virtual identity application 111 executed in the computing device 103 allows a user of a social networking system to establish and register a temporary virtual identity in a social networking service. The temporary virtual identity application 111 can authenticate the identity of the user. The temporary virtual identity application 111 can additionally allow a user to publish content associated with a temporary virtual identity in a social networking system. The various aspects of the temporary virtual identity application 111 will be discussed in more detail herein.

The components executed in the depicted computing device 105, for example, include a social networking service 113. The social networking service 113 facilitates implementation of a social networking system, which can include any type of user community, a blogging service, a microblogging service, etc. A user of the social networking system can have an identity and interact with other users of the social networking system, publish content, and take advantage of other functionality generally found within a social networking system.

As a non-limiting example, in a microblogging service implemented by the social networking service 113, a user (e.g., a publisher) can publish content under an identity in the microblogging service. This content can be published and viewable to other users linked to the publisher of the content. In some social networking systems, for example, the content can be available to "friends," "followers" and/or users in the publisher's "network." In other social networking systems, the content can be publicly accessible without regard to how a particular user is linked to the publisher. It should be appreciated that the social networking service 113 and the temporary virtual identity application 111 can be executed within a single computing device or as an integrated system, and that the depicted embodiment is but one example.

The client 107 is representative of a plurality of client devices that may be coupled to the network 110. The client 107 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 107a may be configured to execute various applications such as a browser 117 and/or other applications. The browser 117 may be executed in a client 107a, for example, to access and render network pages 119, such as web pages, or other network content served up by the computing device 103, 105 and/or other servers. The client 107a may be configured to execute applications beyond the browser 117 such as, for example, email applications, instant message applications, social networking applications, and/or other applications. The client 107 can also include additional special purpose hardware and software components with which a browser 117 or other software executed on the client 107 may interact. As one non-limiting example, the client 107a may comprise a mobile device including cellular telephone and location detection hardware and software components. Accordingly, the mobile device client 107a can detect the location of a user using the client 107a, which can be incorporated into various location based services and applications executed thereon.

In other embodiments, the client 107b can be configured to execute a social networking application 121 configured to access a social networking system implemented by a computing device 105 executing a social networking service 113. As a non-limiting example, a special purpose client software application can be executed on the client 107b to allow a user to access various features of a social networking service 113 on a computing device 105. For example, a client tailored to allow a user to publish content as well as view, browse, and/or search the content of other users in a microblogging network can be executed on the client 107b, which may provide an alternative or more immersive user experience relative to accessing the microblogging network via a client 107a executing a browser 117 that renders network pages 119. It should be appreciated that the above illustrates but one example, and that other variations consistent with this disclosure should be apparent to one of ordinary skill in the art. The client 107b can also include additional special purpose hardware and software components with which the social networking application 121 may interact. As noted above, the client 107b can include location detection hardware and software, which the social networking application 121 can employ to provide location based features and/or services in the context of a social networking system.

In the depicted networked environment, a user of a client 107 may interact with a social networking system facilitated by the computing device 105 executing the social networking service 113. Accordingly, the user can manipulate a user interface encoded by the social networking service 113 and rendered on a client 107a or one that is provided in a social networking application 121 on the client 107a. In one example, the user can authenticate himself by providing login credentials in a user interface on a client 107, which can be verified by the social networking service 113. In this way, the social networking service 113 can provide an identity with which the user interacts with other users in the social networking system, publishes content, or performs other tasks in the social networking system as can be appreciated.

In one embodiment, in a microblogging network implemented by the social networking service 113, the user can publish content that is available to other users or the public. Other users of the social networking system can access the published content via the social networking service 113. In this way, a user can have a permanent identity in the social networking service 113 with which interaction with the social networking system can occur. This identity, in many cases, is identified with a personal identity or an entity with which the user represents.

Accordingly, users of a social networking system may desire to interact with the system using a temporary identity that can be linked to a permanent identity of the user in the social networking service 113. In this way, a user can interact with the social networking system with a temporary virtual identity that masks a permanent identity associated with the user from other users. To facilitate this functionality, the temporary virtual identity application 111 can create a temporary virtual identity on behalf of a user having a permanent identity in a social networking system, and the user can then interact with the social networking system using the temporary virtual identity.

In some embodiments, it may be desired that the temporary virtual identity created on behalf of a user be linked with other attributes or variables. As a non-limiting example, the temporary virtual identity can be linked with a certain geographical location, such as an event, conference or other gathering of people. As another example, the temporary virtual identity can be linked to a certain time period. Accordingly, the temporary virtual identity application 111 can execute an authentication module 121 that can authenticate the identity of the user within the social networking system as well as authenticate the other attributes associated with a temporary identity.

As a non-limiting example, the authentication module 121 can authenticate a user based on whether the user is attending an event linked with a temporary virtual identity. Therefore, if a user having an identity in a social networking system that is described by the characters "JohnDoe," the authentication module 121 can determine whether the user is authorized to be granted a temporary virtual identity linked with the event. Therefore, the temporary virtual identity requested by a user on a client 107 can be, for example, "John@BigConference" and is linked with the permanent identity of the user. In this example, the authentication module 121 can then authenticate whether the user "JohnDoe" is attending the event "BigConference," and only grant the user the above temporary virtual identity if the user can successfully authenticate his attendance. Additionally, in the above example, the authentication module 121 can also authenticate whether the user's name is "John" and only grant the user the above temporary virtual identity if the user's name can be authenticated.

In one embodiment, the event organizers can execute the temporary virtual identity application 111 on a computing device 103 and generate the temporary virtual identity on behalf of the user upon authenticating the attendance of the user at an event. In another embodiment, once the attendance of the user at an event is authenticated, the temporary virtual identity application 111 can issue an authentication code, certificate, and/or a signup code that allows a user to generate a temporary virtual identity in the social networking system that is associated with the event.

In other embodiments, the temporary virtual identity application 111 can be executed by the provider of a social networking system, and the authentication module 121 can authenticate the attendance of a user at a particular event based on a geographic location of the user. As noted above, a client 107 may possess location aware capabilities, such as a global positioning system (GPS) capability, assisted GPS, cellular triangulation, cell identification, enhanced cell identification, network based location, IP location finding, other satellite location compatible systems, etc., and other methods of determining the location of a client communicating with a computing device 103 over a network 110 as can be appreciated. Accordingly, the client 107 can provide its location to the temporary virtual identity application 111 and the authentication module 121, which can verify whether the user is located in or around the geographic location of a particular event for which the user desires a temporary virtual identity. As a non-limiting example, the authentication module 121 can receive the location of the user on a client 107, and as the geographic location of a particular event can be known or determined, the authentication module 121 can verify whether the user is in the geographic vicinity of an event during a particular time period during which the event is scheduled to occur.

Accordingly, the authentication module 121 can facilitate providing temporary virtual identities to a user that are strong, in that they are authenticated based on various factors such as time and location, but that also provide some form of anonymity, in that the temporary virtual identity can be separate from a permanent identity of a user in a social networking system. Because the authentication module 121 authenticates a temporary virtual identity based upon an event, geographic location, and other attributes as can be appreciated, a user associated with a temporary virtual identity can locate and/or interact with other users in a social networking system that are similarly authenticated by an authentication module 121. In other words, a user can interact with other users of a social networking system who are attending the same event or are in a similar geographic location. The temporary virtual identity can provide a degree of anonymity and the user can interact with other users in this way without revealing his permanent identity or linking these other users to his permanent identity.

Upon authentication of a user and the establishing of a temporary virtual identity by the authentication module 121, the temporary virtual identity application 111 can register the temporary virtual identity in the social networking service 113. The temporary virtual identity can be registered in the social networking service 113 and linked to a permanent identity of the user in the social networking service 113. In other words, the temporary virtual identity of the user can be a "sub-identity" of the permanent identity of the user. Accordingly, the user may interact with other users or publish content in the social networking system through his permanent identity in the social networking system, using the same login credentials associated with the permanent identity.

In other embodiments, the temporary virtual identity of a user can be registered in the social networking service 113 as an identity that is separate from the permanent identity of the user. In this way, a separate identity can be created in the social networking service 113 as the temporary virtual identity with which the user may interact with other users or publish content in a social networking system implemented by the social networking service 113.

Because a temporary virtual identity can be, by definition, "temporary" in nature, the temporary virtual identity application 111 can specify a point in time at which the temporary virtual identity expires from the social networking service. As noted above, because a temporary virtual identity, in one embodiment, can be linked with a particular event, the temporary virtual identity application 111 can specify that a temporary virtual identity expires from the social networking service 113 upon conclusion of the event.

The temporary virtual identity application 111 further includes a publishing module 123, which facilitates the publishing of content in a social networking system implemented by the social networking service 113. The content published in the social networking system can be associated with the temporary virtual identity, the permanent identity of a user, or both a temporary virtual identity and a permanent identity associated with a user. Accordingly, a user on a client 107 can establish a temporary virtual identity with the temporary virtual identity application 111 as described above, which can be authenticated with the authentication module 121, and then publish content in a social networking system, which can be managed by the publishing module 123 executed by the temporary virtual identity application 111. It should also be appreciated that in some embodiments, as a temporary virtual identity can be registered within a social networking service 113 on behalf of a user, a user on a client 107 may bypass the publishing module 123 in order to publish content within the social networking service 113 under a temporary virtual identity. In yet other embodiments, the publishing module 123 can be executed within the social networking service 113 and facilitate publishing of content under a permanent identity and/or a temporary virtual identity.

In the non-limiting example of a user establishing and registering a temporary virtual identity that is associated with a particular event, the user can then manipulate a user interface on the client 107 to publish content in the social networking system under the temporary virtual identity. In the example described above of a temporary virtual identity "John@BigConference" that is associated with a permanent identity "JohnDoe," the user can publish content under the "John@BigConference" temporary virtual identity during his attendance at the event associated with the temporary virtual identity. Accordingly, the publishing module 123 can receive content from a user on a client 107 that the user wishes to publish under a temporary virtual identity in the social networking service 113 and publish the content in the social networking service 113. It should be appreciated that in some embodiments, the publishing module 123 can be executed in the social networking service 113 and the user can interact directly with the social networking service 113 in order to publish content under a temporary virtual identity.

Because the publishing module 123 facilitates the publishing of content under a temporary virtual identity, the user can publish content under the temporary virtual identity that is either separate from or linked to a permanent identity of the user. In this way, in one example, the user can interact with other users who may be attending the same event, and the various users having temporary virtual identities authenticated by the authentication module 121 who can communicate at the event via content published under their corresponding temporary virtual identities. In another embodiment, a user can separate content published in the social networking service 113 under a temporary virtual identity that is related to the event from content published under a permanent identity of the user in the social networking system, as the user may desire not to publish content associated with the event to users in the social networking system linked to the permanent identity but not the temporary virtual identity of the user. In other embodiments, the user may desire to publish content that is associated with a temporary virtual identity and a permanent identity. In this way, the user can interact with users associated with his permanent identity as well as those attending a particular event, in a particular geographic location, etc.

Figure 2:
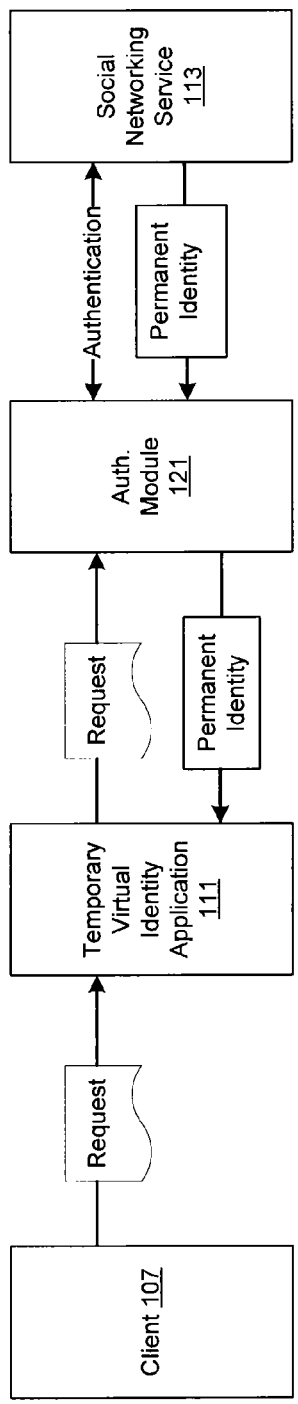
FIG. 2 is a drawing of a client interacting with the temporary virtual identity application and the social networking service in the networked environment of FIG. 1 according to various embodiments of the present disclosure.

Referring next to FIG. 2, which depicts flow of data between the components of the networked environment of FIG. 1 according to various embodiments of the disclosure. In the depicted embodiment, a user on a client 107 (FIG. 1) submits a request to generate a temporary virtual identity to the temporary virtual identity application 111 (FIG. 1). The request can include a desired temporary virtual identity as well as various parameters with which authentication of the user can be completed. In the depicted embodiment, the request can include login credentials of the user that are associated with a permanent identity in a social networking system. In other embodiments, the request can include time and date information if a temporary virtual identity requires authentication with a particular period of time. The request can also include location information regarding the location of the user and/or the client 107 so that the location of the user can be authenticated. As noted above, the location of the user and/or the client 107 can be authenticated based on location data provided by the client 107 and/or other data such as, but not limited to, an IP address of the client 107, cellular tower information, etc.

Depending on the temporary virtual identity requested by a user of the social networking system, various forms of authentication can be required. As a non-limiting example, a user may request a temporary virtual identity that requires no authentication. In other embodiments, a user may request a temporary virtual identity that is linked to a specific event, time period, geographic location, etc. Accordingly, the virtual identity application 111 can provide the request received from the client 107 to the authentication module 121 (FIG. 1). The authentication module 121 can authenticate parameters of the request, as described above, to determine whether the user requesting a temporary virtual identity should be granted such an identity by the temporary virtual authentication application 111.

Additionally, the authentication module 121 can also authenticate the credentials of the user in a social networking system implemented by the social networking service 113 (FIG. 1). Accordingly, the authentication module 121 can authenticate the credentials of a user in the social networking service 113. The social networking service 113 can transmit a data structure representing the permanent identity of the user in the social networking system to the authentication module 121. Accordingly, the temporary virtual identity application 111 can then generate or establish a temporary virtual identity for the user.

Figure 3:
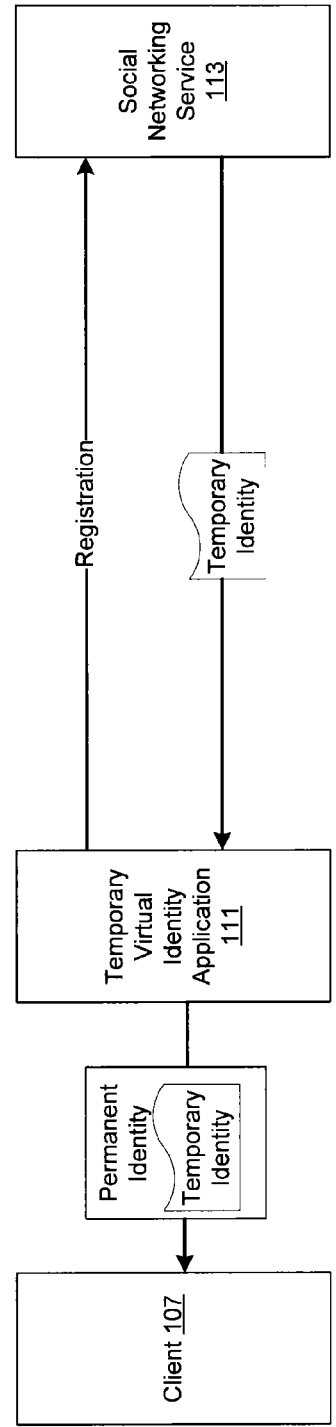
FIG. 3 is a drawing of a client interacting with the temporary virtual identity application and the social networking service in the networked environment of FIG. 1 according to various embodiments of the present disclosure.

Referring next to FIG. 3, shown is an alternative depiction showing subsequent data flow between the various components of the networked environment of FIG. 1 according to various embodiments of the disclosure. In FIG. 3, a user on a client 107 (FIG. 1) has been authenticated such that the authentication module 121 (FIG. 1) and temporary virtual identity application 111 (FIG. 1) have determined that the user can be granted a temporary virtual identity. Accordingly, the temporary virtual identity application 111 registers the temporary virtual identity in the social networking system implemented by the social networking service 113 (FIG. 1).

The social networking service 113 can transmit a data structure or other representation of the registered temporary virtual identity to the temporary virtual identity application 111. The temporary virtual identity application 111 can then transmit the temporary virtual identity to the client 107 so that the user can interact with other users in the social networking system by using the temporary virtual identity. As depicted, the temporary virtual identity can be linked in a permanent identity of the user in the social networking system and provided to a client 107 associated with the user. In this way, the user on a client 107 can interact with other users in the social networking system using the temporary virtual identity or the permanent identity associated with the user in the social networking service 113.

Figure 4:
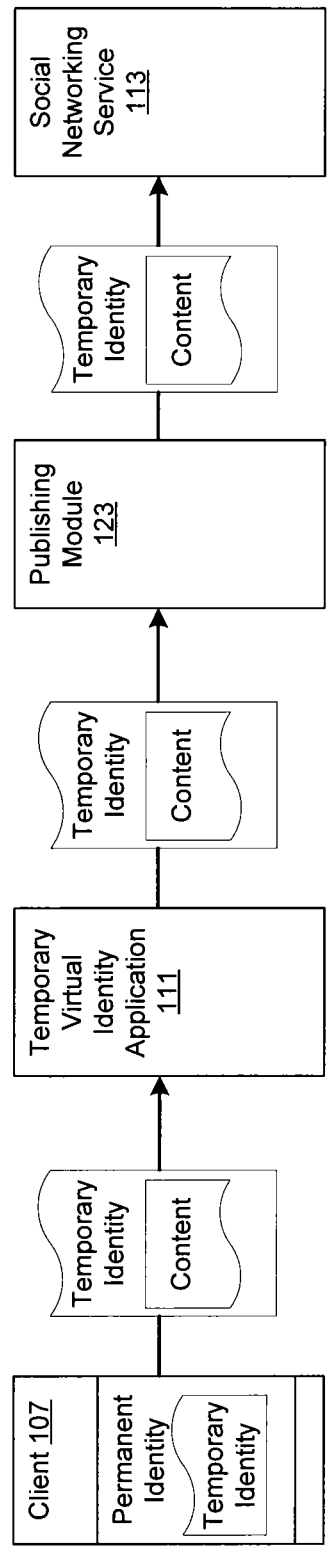
FIG. 4 is a drawing of a client interacting with the temporary virtual identity application and the social networking service in the networked environment of FIG. 1 according to various embodiments of the present disclosure.

Next, reference is made to FIG. 4, which depicts data flow among elements of the networked environment 100 (FIG. 1) of FIG. 1 according to various embodiments of the disclosure. FIG. 4 depicts one example of a user on a client 107 (FIG. 1) publishing content in a social networking system implemented by the social networking service 113 (FIG. 1). In the depicted example, a user on a client 107 can publish content in the social networking service 113 using a temporary virtual identity. As one non-limiting example, the user can publish content in a microblogging service implemented by the social networking service 113. Accordingly, the client 107 transmits the content to the temporary virtual identity application 111. The client 107 can then transmit the content with a data structure or other designation that the content is intended to be published under a temporary virtual identity in the social networking service 113. The publishing module 125 (FIG. 1) of the temporary virtual identity application 111 can then cause the content to be published under the temporary virtual identity of the user in the social networking service 113.

Figure 5:
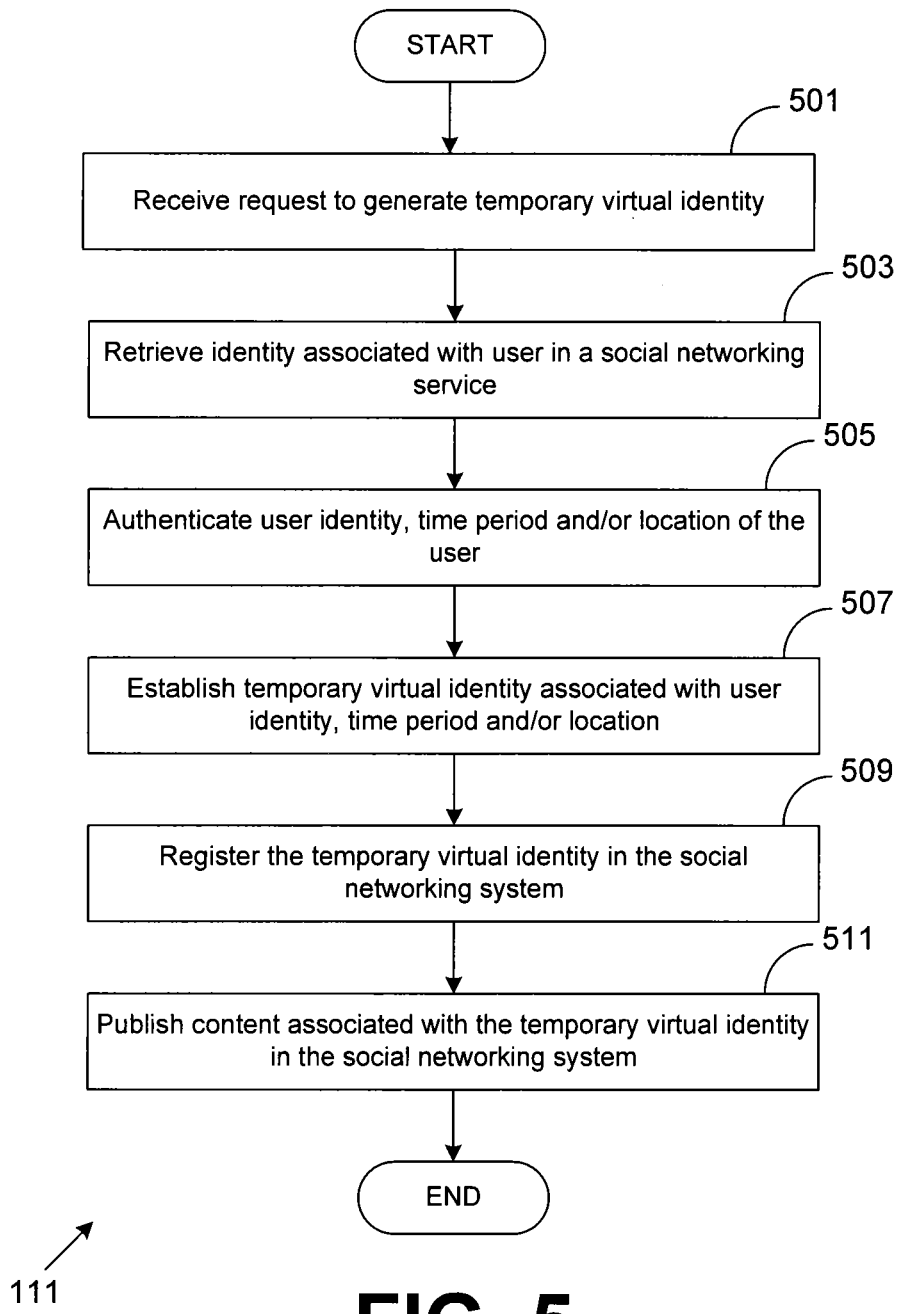
FIG. 5 is a flowchart illustrating one example of functionality of the temporary virtual identity application as executed in a computing device in the networked environment of FIG. 1 according to various embodiments of the present disclosure.

Referring next to FIG. 5, shown is a flowchart that provides one example of the operation of a portion of the temporary virtual identity application 111 (FIG. 1) according to various embodiments. It is understood that the flowchart of FIG. 5 provides merely an example of the many different types of functional arrangements that may be employed to implement the operation of the portion of the temporary virtual identity application 111 as described herein. As an alternative, the flowchart of FIG. 5 may be viewed as depicting an example of steps of a method implemented in the computing device 103 (FIG. 1) according to one or more embodiments. First, in box 501, a request to generate a temporary virtual identity in a social networking system is received. Next, in box 503, a permanent identity of the user in the social networking system is retrieved.

In box 505, the identity of the user is authenticated by the authentication module 123 of the temporary virtual identity application 111. Additionally, the authentication module 123 of the temporary virtual identity application 111 authenticates other parameters that may be required to authenticate depending on the temporary virtual identity requested by the user. In box 507, the temporary virtual identity is registered in the social networking system. In box 509, content is published using the temporary virtual identity in the social networking system.

Figure 6:
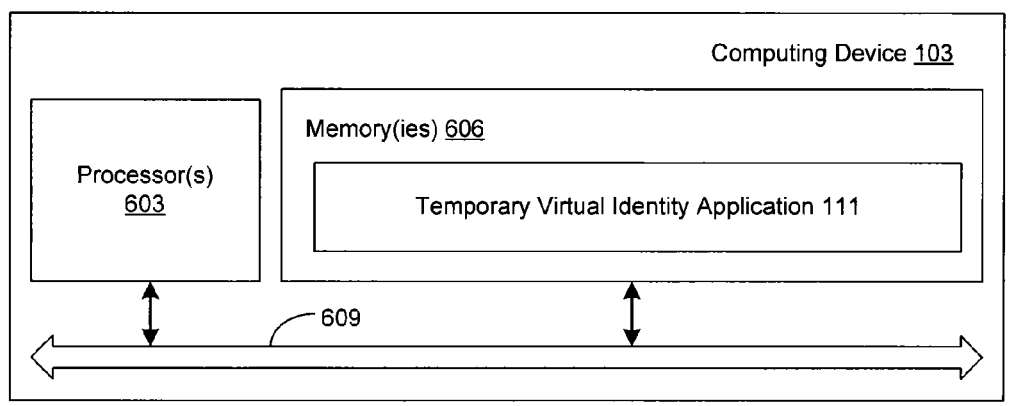
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 (FIG. 1) according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are a temporary virtual identity application 111 (FIG. 1), and potentially other applications. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 110 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although temporary virtual identity application 111, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the temporary virtual identity application 111. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including temporary virtual identity application 111, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium, comprising:
a program executable in a computing device, the program configured to cause the computing device to:
retrieve an identity associated with a user in a social networking service;
authenticate the identity associated with the user in the social networking service by verifying login credentials provided in a request from a client with login credentials in the social networking service;
authenticate at least one parameter associated with the user in addition to authentication of the identity, the at least one parameter being a requirement for issuing the user a temporary virtual identity in the social networking service, the at least one parameter comprising at least one of: a geographic location of the user, a time period, or attendance of the user at an event;
generate the temporary virtual identity associated with the user within the social networking service;
register the temporary virtual identity in the social networking service;
associate the temporary virtual identity with the identity of the user in the social networking service;
publish, in the social networking service, content associated with the user under the temporary virtual identity, the published content associated with at least one of the time period, the geographic location, or the event, the published content further being disassociated from the identity associated with the user in the social networking service; and
expire the temporary virtual identity by deleting the temporary virtual identity from the social networking service after a predetermined period of time.

2. A system, comprising:
at least one computing device; and
a temporary virtual identity application executable in the at least one computing device, the temporary virtual identity application comprising:
logic that authenticates an identity within a social networking service, the identity being associated with a user;
logic that authenticates at least one parameter associated with the user in addition to authentication of the identity, the at least one parameter being a requirement for issuing the user a temporary virtual identity, the at least one parameter comprising at least one of: a time period, a location, or attendance of the user at an event and the temporary virtual identity being associated with the at least one parameter and the identity within the social networking service;
logic that generates the temporary virtual identity within the social networking service, the temporary virtual identity being associated with the user; and
logic that registers the temporary virtual identity in the social networking service.

3. The system of claim 2, further comprising:
logic that retrieves an identity associated with the user in the social networking service; wherein the identity associated with the user is retrieved from the social networking service.

4. The system of claim 3, further comprising logic that publishes, in the social networking service, content associated with the user under the temporary virtual identity, the published content associated with at least one of a time period or a location.

5. The system of claim 4, wherein the logic that authenticates the identity with the social networking service further comprises logic that verifies login credentials provided in a request from a client with login credentials in the social networking service.

6. The system of claim 4, wherein the logic that authenticates the at least one parameter further comprises:
logic that issues an authentication certificate to the user; and
logic that verifies the authentication certificate when the temporary virtual identity is registered.

7. The system of claim 6, wherein the temporary virtual identity is associated with an event occurring in the location and the time period.

8. The system of claim 7, wherein the logic that issues the authentication certificate further comprises logic that verifies the attendance of the user at the event.

9. The system of claim 3, wherein the logic that establishes the temporary virtual identity further comprises the logic that detects a geographic location of the user from a mobile device of the user.

10. The system of claim 9, wherein the logic that detects the geographic location of the user further comprises logic that accesses a global positioning system (GPS) capability of the mobile device.

11. The system of claim 9, wherein the logic that establishes the temporary virtual identity further comprises logic that detects a network location of the user based at least upon an internet protocol (IP) address from which the mobile device is communicating.

12. The system of claim 3, wherein the logic that registers the temporary virtual identity further comprises logic that associates the temporary virtual identity with the identity of the user in the social networking service.

13. The system of claim 4, wherein the logic that publishes content associated with the user under the temporary virtual identity further comprises logic that masks a relationship between the temporary virtual identity and the identity of the user.

14. The system of claim 3, further comprising logic that expires the temporary virtual identity after a predetermined period of time.

15. A computer-implemented method, comprising
retrieving, in at least one computing device, an identity associated with a user in a social networking service;
establishing, in the at least one computing device, a temporary virtual identity associated with the user within the social networking service, the temporary virtual identity associated with at least one of: a time period, a location or attendance of the user at an event;
registering the temporary virtual identity in the social networking service; and
publishing, in the social networking service, content associated with the user under the temporary virtual identity, the published content associated with at least one of: the time period, the location or the event, the content further being disassociated from the identity of the user in the social networking service.

16. The computer-implemented method of claim 15, further comprising authenticating the temporary virtual identity by authenticating at least one of: an identity of the user, the time period or the location.

17. The computer-implemented method of claim 15, wherein the event is associated with the location and the time period.

18. The computer-implemented method of claim 17, wherein authenticating the temporary virtual identity further comprises:
   issuing an authentication certificate to the user; and
   verifying the authentication certificate when the temporary virtual identity is registered.

19. The computer-implemented method of claim 18, wherein issuing the authentication certificate further comprises verifying the attendance of the user at the event.

20. The computer-implemented method of claim 18, wherein issuing the authentication certificate further comprises issuing the user an authentication code; and
   registering the temporary virtual identity with the social networking service further comprises verifying the authentication code.

21. The computer-implemented method of claim 15, wherein establishing the temporary virtual identity further comprises detecting a geographic location of the user from a mobile device of the user.

22. The computer-implemented method of claim 21, wherein detecting the geographic location of the user further comprises access a global positioning system (GPS) capability of the mobile device.

23. The computer-implemented method of claim 15, wherein establishing the temporary virtual identity further comprises detecting a network location of the user based at least upon an internet protocol (IP) address from which the user is communicating.

24. The computer-implemented method of claim 15, wherein registering the temporary virtual identity further comprises associating the temporary virtual identity with the identity of the user in the social networking service.

25. The computer-implemented method of claim 15, wherein publishing content associated with the user under the temporary virtual identity further comprises masking a relationship between the temporary virtual identity and the identity of the user.

26. The computer-implemented method of claim 15, further comprising expiring the temporary virtual identity after a predetermined period of time.

\* \* \* \* \*